March 14, 1967  H. A. STORCH  3,308,546
BEARING GAUGE
Filed Jan. 14, 1965  2 Sheets-Sheet 1
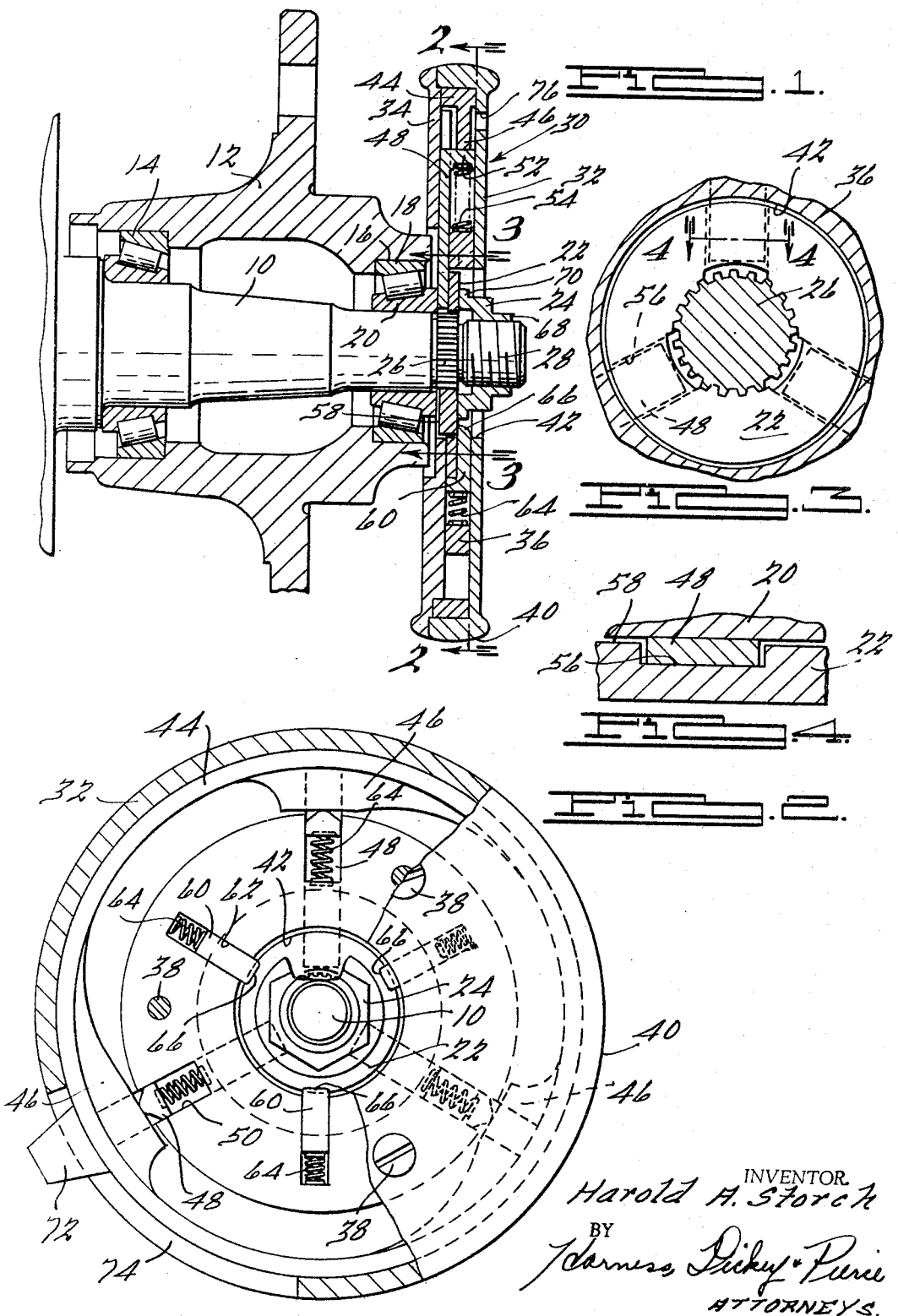
INVENTOR.
Harold A. Storch
BY
Harness, Dickey & Pierce
ATTORNEYS.

March 14, 1967  H. A. STORCH  3,308,546
BEARING GAUGE
Filed Jan. 14, 1965  2 Sheets-Sheet 2
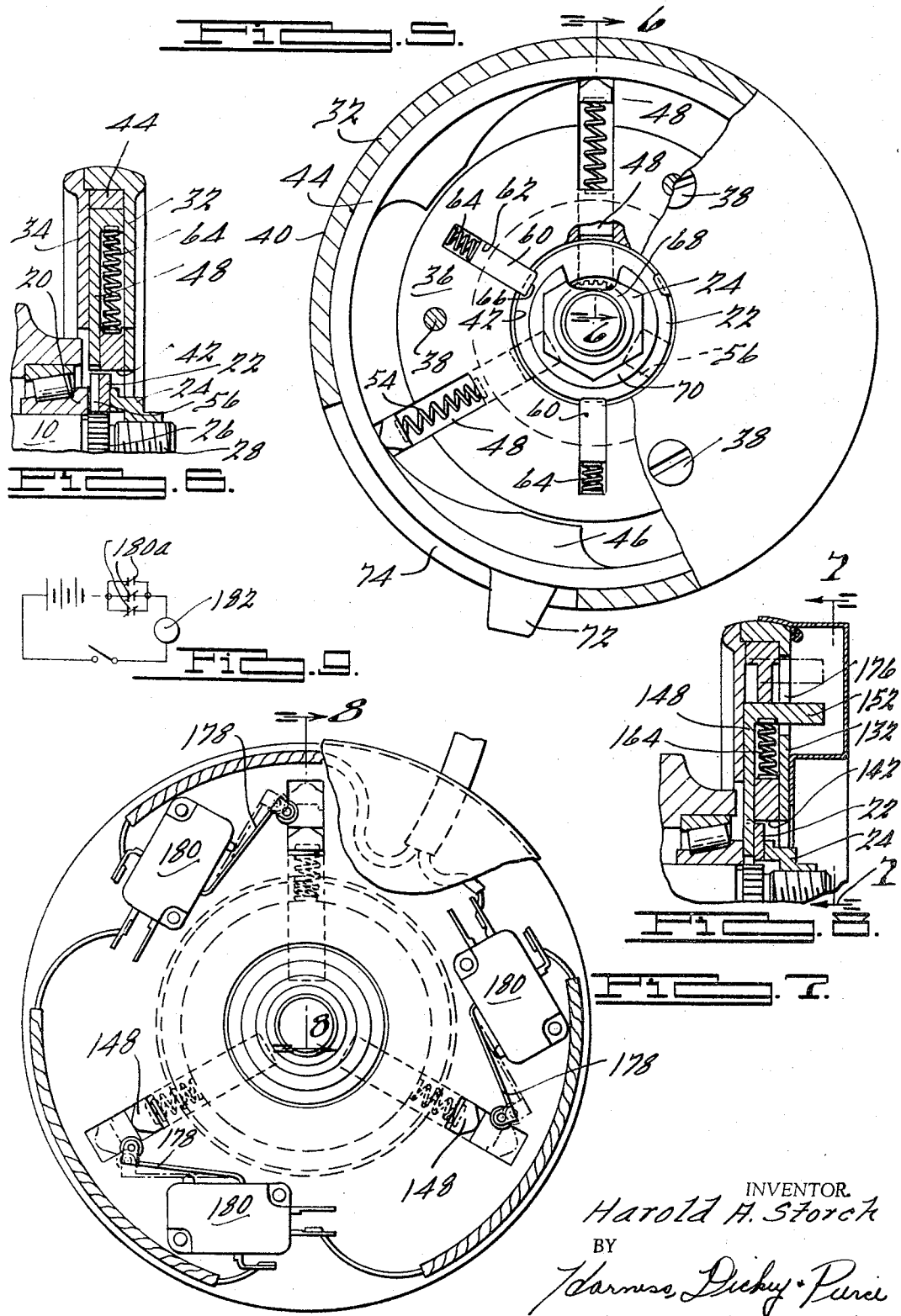
INVENTOR.
Harold A. Storch
BY
Harness, Dickey & Pierce
ATTORNEYS United States Patent Office 3,308,546
Patented Mar. 14, 1967

3,308,546
BEARING GAUGE
Harold A. Storch, Birmingham, Mich., assignor to Federal Screw Works, Detroit, Mich., a corporation of Michigan
Filed Jan. 14, 1965, Ser. No. 425,499
4 Claims. (Cl. 33—174)

This invention relates to gauges, and particularly to a gauge for use in properly installing and tightening a washer and nut on a wheel spindle or other male threaded member where a predetermined spacing between the assembled parts is to be established.

While not limited thereto, the gauge of the present invention finds particular utility in connection with the wheel spindles or axles of vehicles and the antifriction wheel bearings mounted on said spindles or axles. The customary front wheel spindle of a passager car, for example, utilizes a pair of antifriction bearings which support a rotary hub to which the wheel is bolted. The bearings are held on the non-rotating spindle by an anti-rotational washer and a nut. A spacing of between .002 inch and .008 inch is provided between the washer in the inner race of the outboard bearing. This spacing allows room for expansion of the bearings if they become heated without the inner races of the bearings seizing. It is desirable that the inner bearing races be able to turn somewhat on the spindle. Similarly, the spacing should be such as to to properly support the bearings and prevent "hammering" or "knock" of the bearings which can result from too loose a fit. Either excessive tightness or looseness of the washer and nut on the spindle can produce "Brinelling" of various parts of the bearings and drastically shorten their useful life.

In current automotive practice, vehicle manufacturers generally secure wheel bearings to their spindles by a procedure in which the nut is tightened to a predetermined torque rating and then backed off a fraction of one turn. It is believed by the vehicle manufacturers that this procedure will produce the desired spacing in a majority of spindles. However, no accurate measurement of the actual spacing is made and the reliance upon the torque to which the nut is tightened produces many errors in spacing between the washer and the adjacent inner bearing race. These errors stem from the manufacturing tolerances of the various parts involved and particularly the frequent absence of squareness of face of the inner bearing race adjacent the washer. In addition, assembly line workers frequently make errors in the torque to which the nut is tightened and in the amount by which the nut is backed off. It is, therefore, an object of the present invention to provide a gauge for use in tightening bearings or the like which will enable the establishment of a relatively accurate clearance between the assembled parts, which will minimize the possibility of error resulting from the exercise of judgment, and which will eliminate any reliance upon the torque of the nut in establishing the desired clearance.

It is another object of the present invention to provide a bearing gauge which accurately measures the clearance between an antirotational washer and an adjacent bearing race at a plurality of different locations around the face of the bearing race to insure the establishment of the clearance between the washer and the point of maximum axial dimension of the bearing race face.

It is still another object of the present invention to provide a gauge of the above character which is convenient to use, low in cost, made of a rugged long-lasting construction and will function with a high degree of reliability.

It is a further object of the present invention to provide a gauge of the above character which may be coupled to a power wrench or other automatic fastener applying means to interrupt loosening of the fastener at the appropriate moment.

These and other objects of the present invention will become apparent from the following detailed description taken in conjunction with the accompanying drawings, wherein:

FIGURE 1 is a vertical axial sectional view through a wheel bearing assembly showing the gauge of the present invention connected thereto;

FIG. 2 is a sectional view of the structure illustrated in FIG. 1 taken along the line 2—2 thereof;

FIG. 3 is a sectional view of the structure illustrated in FIG. 1 taken along the line 3—3 thereof;

FIG. 4 is a sectional view of the structure illustrated in FIG. 3 taken along the line 4—4 thereof;

FIG. 5 is a view similar to FIG. 2 but showing the parts in another position thereof;

FIG. 6 is a sectional view of the structure illustrated in FIG. 5 taken along the line 6—6 thereof;

FIG. 7 is a sectional view of a modified form of the present invention taken along the line 7—7 of FIG. 8;

FIG. 8 is a view of the structure illustrated in FIG. 7 taken along the line 8—8 thereof; and FIG. 9 is a wiring diagram of a power wrench control using the gauge of FIGS. 7 and 8.

Referring now to the drawings, FIGURE 1 illustrates a non-rotatable wheel spindle 10 which forms a part of a non-rotating portion of an automobile such as a steering knuckle (not shown). A hub 12 is positioned on the spindle 10 through intermediary inboard and outboard antifriction bearings 14 and 16, respectively. The outboard bearing 16 will be seen to have an outer race 18 engageable with the hub and an inner race 20 engaging the spindle 10. The hub 12 is, of course, designed to be bolted to a wheel (not shown). The bearings 14 and 16 and the hub 12 are maintained on the spindle by means of anti-rotational washer 22 and a nut 24 applied to the spindle 10. The washer 22 is provided with a splined opening adapted to be conformably received on a splined portion 26 of the spindle 10 whereas the nut 24 is threaded on to a threaded portion 28 of the spindle 10. The washer 22 and nut 24 are of a configuration somewhat different from the nut and washer configuration currently employed on most passenger car wheel spindles. It is the current practice to employ a washer having a tang adapted to be received in a milled slot formed in the spindle and a castellated nut is used which is held in place by a cotter pin. It is to be understood, however, that the bearing gauge of the present invention is usable with this currently employed nut and washer configuration and is not limited to the particular washer and nut configuration illustrated herein.

The structure described thus far forms a permanent part of the vehicle rather than a part of the gauge per se. The gauge itself is enclosed by a housing 30 consisting of an outboard housing member 32, an inboard housing member 34, and a retainer or spacing member 36 positioned between the housing members 32 and 34. The various housing portions 32, 34 and 36 are secured together by a plurality of screws 38 and define a unit of generally flat annular shape having a circular outer periphery 40 and a central through opening 42. Supported within the housing 30 for angular movement above the center of the opening 42 is a generally clindrical cam member 44 having a plurality of radially inwardly extending lobes 46. In the illustrated embodiment the lobes 46 are three in number. Each of the lobes 46 will be seen to extend in a circumferential radially inwardly inclined direction and the lobes are equally spaced from one another about the inner circumference of the cam 44.

The lobes 46 are designed to cooperate with a similar number of gauge fingers 48. The gauge fingers 48 are confined within grooves 50 formed in the housing retainer 36 and between the housing members 32 and 34 for radial sliding movement. As may be seen in FIG. 1, each gauge finger 48 is provided with a shoulder portion 52 at its radially outer end which is engageable by a separate coil spring 54 seating against the retainer member 36. The springs 54 urge each gauge finger 48 in a radially outward direction.

Each of the gauge fingers 48 projects into the central opening 42 formed in the housing 30. In this location each gauge finger is adapted to be positioned between the bearing race 20 and the washer 22. Furthermore, each gauge finger 48 is adapted to lie within a radial groove 56 formed on a rear face 58 of the washer 22. Each gauge finger 48 is of a thickness which is greater than the depth of the groove 56 by an amount equal to the clearance which it is desired to establish between the washer member 22 and the bearing race 20. As mentioned previously, this clearance is desirably between .002 and .008 inch in most spindle applications. The grooves 56 permit the gauge fingers 48 to be made of a substantial thickness so that they will not deform readily and will stand up under repeated usage. If it were not for the provision of the grooves 56, the gauge fingers 48 would have to be made to a thickness exactly equal to the desired clearance, a dimension which is so small that the gauge fingers would be very fragile and subject to rapid deterioration.

Prior to installation of the washer 22 onto the spindle 10, the washer 22 is inserted into the opening 42 of the gauge to cause the gauge fingers 48 to lie within the grooves 56. In order to insert the washer 22 into the opening 42, the washer must be cammed past a plurality of latches 60 which are disposed within slots 62 of the retainer member 36 for movement in a radial direction. The latches 60 are urged in a radially inward direction by coil springs 64 seated against the retainer members 36 and are provided with a curved radially inner peripheral surface 66 which is engageable by the outer periphery of the washer 22 as it is inserted into the opening 42. During such insertion the washer 22 cams its way past the latches 60 causing the latches to move radially outwardly in their slots 62 until the washer 22 has moved past them. The latches will then return to their illustrated positions under the influence of their springs 64 in order to trap the washer between the gauge fingers 48 and the latches 60. Three latches 60 are illustrated and they are arranged one between each pair of gauge fingers 48. In other words, the latches 60 and gauge fingers 48 are disposed in alternated or staggered relationship.

With the washer 22 assembled to the gauge as described above, the combined washer and gauge is installed onto the splined spindle portion 26. After this is done the nut 24 is threaded onto the spindle portion 28. In this connection, it should be pointed out that the nut 24 is provided with a collar portion 68 which is squeezed or deformed to cause the adjacent thread of the nut to frictionally grip the threaded stud portion 28. By this means the nut 24 is provided with a self-locking action to resist inadvertent or accidental rotation of the nut on the stud. This eliminates the need for a cotter key. Additionally, the nut 24 is provided with an enlarged diameter portion 70 which spacedly surrounds the spindle splined portion 26 and engages the washer 22. The nut is threaded onto the spindle 10 until the portion 70 thereof contacts the washer 22 causing the washer to firmly clamp the gauge fingers 48 against the inner bearing race 20. After this is done, the cam 44 is rotated or moved angularly 45° in order to position the cam lobes 46 out of alignment with the gauge fingers 48. This is done by manual movement of a handle 72 formed on the cam 44 which projects through a slot 74 formed in the outer periphery 40 of the housing 32. When this is done the only thing that will prevent radially outward movement of the gauge fingers 48 is the frictional clamping of the gauge fingers 48 between the bottom wall of the washer grooves 56 and the inner bearing race 20. Next, the nut 24 is backed off or reversely rotated until each of the gauge fingers 48 is freed or unclamped and moves radially outwardly under the influence of its adjacent spring 54. This movement may be observed through windows 76 formed in the housing member 32 adjacent each gauge finger. When the person assembling the parts notes that all gauge fingers have moved radially outwardly (and this movement may also be audibly detected), further reverse rotation of the nut 24 is stopped. At this point the entire gauge may then be slipped axially off of the spindle 10. It will be appreciated that the gauge cannot be removed from the assembly until all gauge fingers have moved radially outwardly clear of the washer 22. This is because the presence of a gauge finger 48 in the opening 42 would contact the washer 22 and trap it in the gauge opening 42. This insures that the nut will be loosened at least the desired amount.

FIGURES 1 and 2 illustrate the position of the cam 44 and the gauge fingers 48 with the gauge fingers 48 positioned within the opening 42 and clamped between the washer 22 and inner bearing race 20. FIGS. 5 and 6 illustrate the position of the cam 44 and the gauge fingers 48, with the cam 44 moved to finger releasing position and with the gauge fingers 48 moved radially outwardly of the opening 42.

FIGURES 7 and 8 illustrate a somewhat modified form of gauge which is basically similar to the gauge illustrated in FIG. 1, but which is equipped with a plurality of switches for the interruption of a power wrench for driving the nut 24. In the embodiment of FIGS. 7 and 8, a housing member 132 is provided with an enlarged radially extending slot 176 through which an enlarged shoulder portion 152 of each gauge finger 148 projects. When a gauge finger 148 is released from the clamping action of the washer 22 it will move radially outwardly under the influence of its adjacent spring 164 so that its shoulder portion 152 will actuate the arm 178 of a switch 180. It will be noted that a switch 180 is provided for each gauge finger 148. The released position of the gauge finger shoulder portions 152 and the switch arms 178 are shown in broken lines in FIGS. 7 and 8. The switches 180 are desirably wired in parallel and have their contacts closed when the arms 178 and 148 are disposed in a radially inward position in which the gauge fingers are within an opening 142 of the gauge member. However, when a gauge finger 148 is released and moves radially outwardly, the contacts 180a of its switch 180 are opened.

As representatively illustrated in FIG. 9, when all contacts 180a are open the energizing circuit for an electrically operated power wrench 182 is interrupted, thus terminating rotation of the nut 24 and leaving the nut 24 in a position in which the proper clearance will be maintained between the washer 22 and the inner bearing race 24. It will be apparent that the embodiment of FIGS. 7 and 8 eliminates the necessity of the assembly worker of visually observing the movement of the gauge fingers to the released position and then manually terminating operation of a wrench by providing automatic termination of wrench operation when the gauge fingers have been released.

It is to be noted that the gauge fingers of each embodiment of the invention contact the bearing race at spaced points about the circumference of the outer face of the bearing race 20. By this means, if the bearing race 20 is not square to the axis of the spindle the point of maximum axial dimension of the bearing race will be contacted and a clearance will be established which may be regarded as a minimum clearance. In the event of a cocked face of the bearing 20, one gauge finger might be released prior to the other gauge fingers. However, reverse rotation of the nut 24 is not stopped until all gauge fingers have been released.

While it will be apparent that the preferred embodiments of the invention described herein are well calculated to fulfill the objects above stated, it should be appreciated that the invention is susceptible of modification, variation and change without departing from the fair scope and meaning of the subjoined claims.

What is claimed is:

1. A gauge including a housing having a central opening for receiving a washer or the like, a plurality of gauge fingers slidably carried by said housing and movable into said opening for engagement with the washer and out of said opening out of engagement with the washer, a plurality of springs, each spring being operable to bias one of said gauge fingers in a direction out of said opening, an annular cam angularly movable in said housing, said cam surrounding said opening and having a plurality of lobes each engageable with one of said gauge fingers for moving said gauge fingers radially inwardly into said opening against the force of said springs, said cam being movable to a position freeing said guage fingers for movement by their springs away from said washers, and a plurality of spring biased latches engageable with said washer on the opposite side thereof from said gauge fingers, said latches having cam surfaces whereby said latches will be moved radially outwardly upon insertion of said washer in said opening to permit said washer to be moved into engagement with said gauge fingers.

2. A guage including a housing having a central opening for receiving a washer or the like, a plurality of gauge fingers slidably carried by said housing and movable into said opening for engagement with the washer and out of said opening out of engagement with the washer, a plurality of springs, each spring being operable to bias one of said gauge fingers in a direction out of said opening, and an annular cam angularly movable in said housing, said cam surrounding said opening and having a plurality of lobes each engageable with one of said gauge fingers for moving said gauge fingers radially inwardly into said opening against the force of said springs, said cam being movable to a position freeing said gauge fingers for movement by their springs away from said washers, including switches operated by said gauge fingers for controlling the operation of a power wrench used to apply a fastener to an assembly of which the washer is a part.

3. A bearing gauge for use with an assembly consisting of a spindle, a bearing, a washer, and a nut threaded on said spindle, said gauge including a housing having a central opening for receiving said washer, a plurality of radially movable gauge fingers disposed in said housing and arranged to project into said opening for engagement with one side of said washer, spring means urging said gauge fingers in a radially outward direction out of engagement with said washer, an angularly movable cam operable to force said gauge fingers into said opening, said cam being movable to a position freeing said gauge fingers for movement away from said washer, and a plurality of spring biased latches engageable with the washer on the side thereof opposite from said gauge fingers, said latches being movable out of said opening to permit said washer to be inserted between said latches and said gauge fingers.

4. The method of using a gauging tool having a gauging finger movable radially into and out of a clearance space to be established, a holding member operable to hold said gauging finger in an extended position in said clearance space and a spring biasing said gauging finger in a direction tending to move it out of said clearance space, said method comprising the steps of positioning said gauge finger between a pair of relatively axially adjustable parts with said holding member holding said gauge finger in said extended position, relatively moving the parts toward one another to clamp said gauge finger therebetween, releasing said holding means and adjusting said parts axially away from one another until said gauge finger is moved out of said space by said spring.

References Cited by the Examiner

UNITED STATES PATENTS 1,949,971  2/1934  Miller _____ 33—180
2,584,602  2/1952  McKee _____ 33—178

LEONARD FORMAN, *Primary Examiner.*

ISAAC LISANN, *Examiner.*

B. DONAHUE, J. M. FREED, *Assistant Examiners.*